Nov. 20, 1962   J. H. COOPER   3,064,869
STRIP FEED FOR STRIP JOINING APPARATUS
Filed Feb. 6, 1961   2 Sheets-Sheet 1

INVENTOR
JOSEPH H. COOPER
BY *Francis J. Klempay*
ATTORNEY

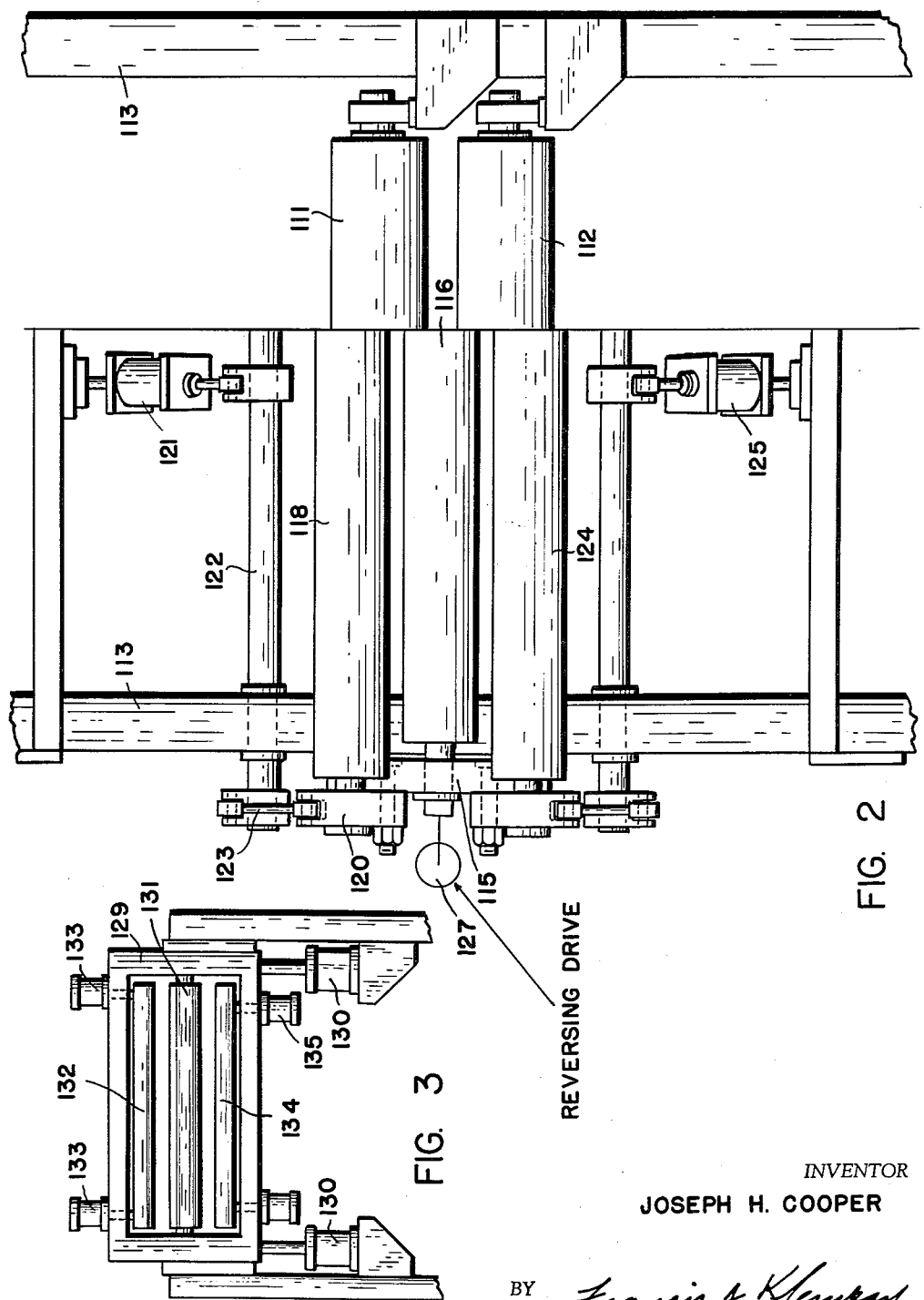

United States Patent Office 3,064,869
Patented Nov. 20, 1962

3,064,869
STRIP FEED FOR STRIP JOINING APPARATUS
Joseph H. Cooper, Warren, Ohio, assignor to The Taylor-Winfield Corporation, Warren, Ohio, a corporation of Ohio
Filed Feb. 6, 1961, Ser. No. 87,165
5 Claims. (Cl. 226—110)

This invention relates to the art of joining strip in end-to-end relation, and more particular to improved and simplified apparatus for loading the strip stock into apparatus for so joining the strip. It is now common practice to utilize such strip joining apparatus in connection with processing lines wherein the strip is supplied in a normally continuous manner—being payed off a coil, for example—and in such lines the joining apparatus is so designed as to permit the strip to flow through the apparatus, with the strip being stopped only when it is necessary to join onto the continuous emitted length the leading end of a new coil of strip. Normally it is desirable to run the processing equipment continuously, requiring strip storage means between the equipment and the joiner, and in order to keep this storage means as small and simple as possible it is highly desirable that the joining cycle be accomplished very rapidly.

For accomplishment of the above, I have heretofore proposed in my co-pending application Serial No. 851,287, filed November 6, 1959, now Patent No. 3,021,416, to design the joining apparatus in such manner that while a length of strip is running through the apparatus from one coil the leading end of a second length of strip from another coil may be safely fed into the throat of the instrumentalities used to join the strip so that immediately upon the first coil being exhausted the first length of strip from the first coil may be stopped in the apparatus and the apparatus actuated through its automatic cycle to enable the resumption of flow of continuous strip in the shortest time possible. As disclosed in said co-pending application, the strip lengths from the alternate coils move into the joining apparatus along separate paths and these paths are alternately utilized for loading the leading end portions of the succeeding strip lengths.

The object of the present invention is to provide improved and simplified apparatus for accomplishing the loading of the leading end portions of the successive strip lengths in the manner outlined generally above. Specifically, the improvement resides in the reduction of the number of moving parts, more compactness, the use of shorter guiding means which do not mar the strip, and the substantial elimination of all maintenance problems.

The above and other objects and advantages of the invention will become apparent upon consideration of the following specification and accompanying drawing wherein there is disclosed the preferred embodiment of the present invention.

In the drawing:

FIGURE 2 is a front elevation, on off-set planes, of the feeding apparatus shown in FIGURE 1; and FIGURE 3 is an elevation taken along the lines 111—111 of FIGURE 1.

Figure 1:
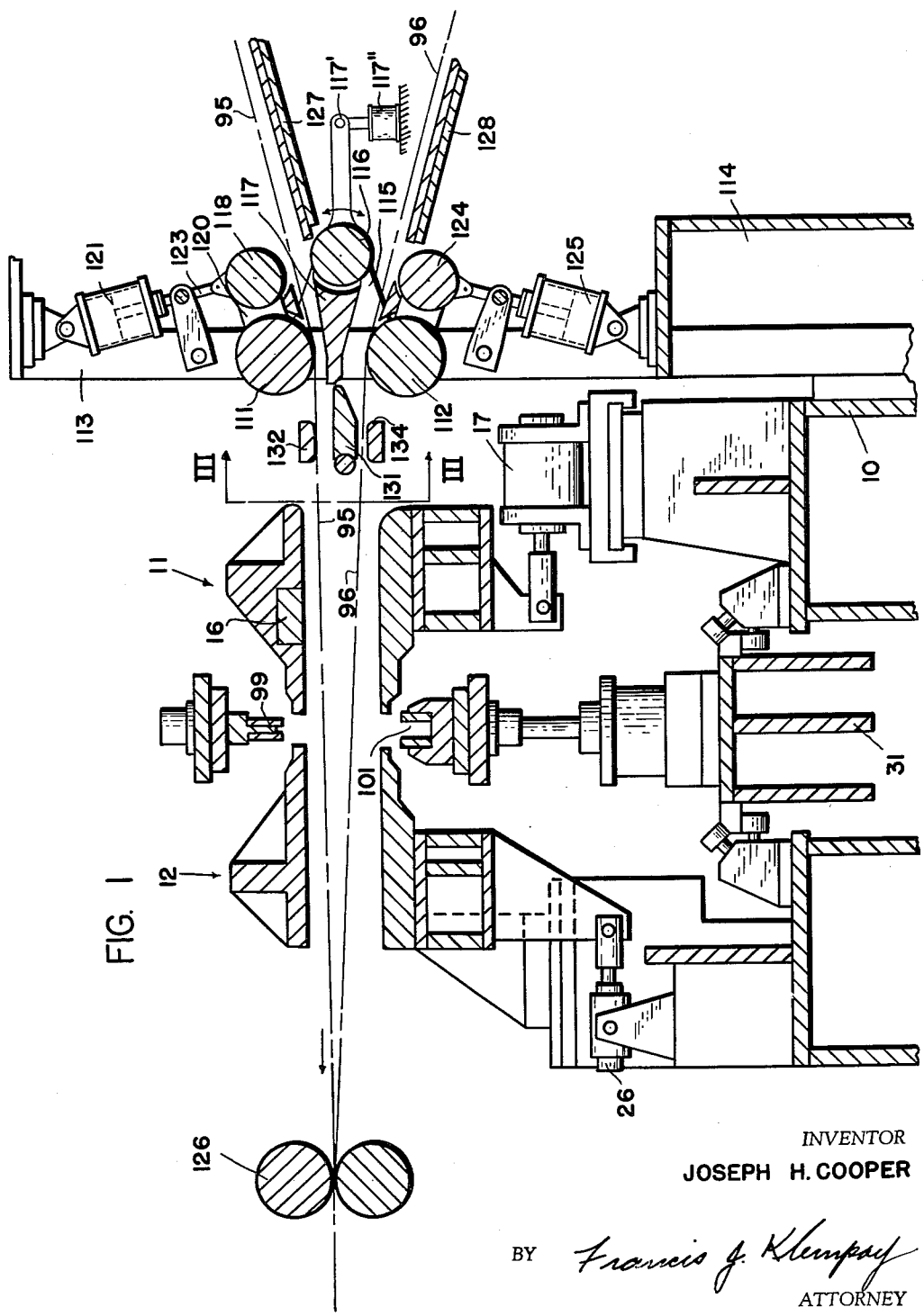
FIGURE 1 is a fragmentary longitudinal section through a strip feeding or preloading device constructed according to the present invention, the device being shown in operative relation to a strip joining assembly.

Consistent with the disclosure in the above-mentioned co-pending application Serial No. 851,287, the strip joining apparatus illustrated herein comprises a base 10 mounting a pair of clamps 11 and 12 which are spaced longitudinally on opposite sides of the working plane of the double shear 99, 101. The stock moves through the apparatus along alternate paths 95 and 96, and as explained above and more fully in the above-mentioned co-pending application while strip is flowing through the apparatus along either of these paths the leading end portion of the next succeeding strip length to be joined is fed past the first or entry shear blade along the other of said paths. When the new strip length is fed along the upper path 95 it is cantilevered forward and is maintained in upper position by a magnet 16 which is built into the upper shoe of the forward clamp 11. Again, after the moving strip length is stopped and the forward end of the next succeeding strip length is properly positioned the clamps 11 and 12 are closed and the shear actuated, after which the clamp 11 is momentarily opened to allow the cropped end of the first length to be withdrawn. Upon closing of clamp 11, clamp 12 is tilted by cylinder 26 and clamp 11 is moved to the left by cylinder 17 to overlap the strip ends and permit mash seam welding of the same by electrodes, not shown herein, but which are carried with the transversely movably frame 31 and thus can follow across the work as the shear moves out of the working throat of the assembled apparatus.

While the above outlined strip joining apparatus is preferred in most applications, it should be understood that the invention herein involved in suitable for use with other kinds of strip joining apparatus such as, for example, the kind where mechanical stitching is utilized to join overlapped strip ends. In such applications, also, the shear may be dispensed with and, indeed, such alternate apparatus may also not require the stock clamps 11 and 12. The apparatus of the present invention should therefore be considered primarily as an improvement in the method and means for feeding or preloading the leading end portions of successive strip lengths into an apparatus generally capable of joining the said leading end portions to the trailing end portions of strip lengths which have been run through the apparatus.

Referring again to the drawing, it should be noted that I provide a pair of vertically spaced guide or deflector rolls 111 and 112 which are journaled at their ends in suitable bearings carried by the transversely spaced uprights 113 of a base 114 which normally is rigidly connected to the base 10 of the joining apparatus. Journaled in brackets 115 extending forwardly of the uprights 113 is a drive roll 116, and it should be noted that roll 116 is positioned forwardly of and vertically intermediate the rolls 111 and 112. Positioned immediately behind the drive roll 116 is a deflector or guide wedge 117 the purpose of which will be described later.

Positioned above the roll 116 and in parallel relation therewith is a pressure roll 118 which is journaled at its ends in links 120 which are pivotally mounted on the uprights 113 for movement about a horizontal axis. Roll 118 is arranged to be moved into pressure engagement with roll 116 and away therefrom by a fluid cylinder 121 acting through an equalizing rocker shaft 122 and links 123 which connect crank arms on the shaft 122 with the links 120. A lower pressure roll 124 positioned below the drive roll 116 is similarly swingably mounted on the uprights 113 for actuation by the fluid cylinder 125.

The equipment thus far described is intended to be supplied with strip coming from a pair of vertically spaced uncoilers, not shown, with the strip from the upper uncoiler coming along the path 95 which bends over the roll 111 and the strip from the lower uncoiler coming along the path 96 which bends over the lower deflector roll 112. Both of these paths converge in the pass of a pair of pinch rolls 126 positioned at the exit end of the joining apparatus and which, in accordance with regular practice, may be driven at variable speed to draw strip from either of the uncoilers through the combined apparatus herein shown in a substantially continuous manner. The pinch rolls 126 may be stopped, when desired, to interrupt the flow through the apparatus of the tail end portion of a coil length of strip to permit the leading end portion of the next succeeding coil length to be joined thereto. By reason of the bending contact of paths 95 and 96 with the spaced deflector or guide rolls 111 and 112 these guide rolls establish upper and lower paths of strip travel through the strip joining apparatus.

Drive roll 116 may be driven by any suitable type of reversing drive, and in actual practice a combined reversing motor and gear reduction, not shown, is used. In the drawing the drive is shown schematically at 127a. In actual practice, also, it is desirable to make certain or all of the rolls rubber covered so as to eliminate marking of the strip, and in the case of the drive roll 116 to provide sufficient driving traction.

The equipment thus far described provides a complete operative preloading device entirely suitable for certain kinds of strip joining apparatus. Thus, assuming that an area along the paths 95, 96 rearwardly of the rolls 111, 112 is a strip joining station having instrumentalities normally retracted from the paths, strip from either the upper or lower source (uncoilers) may be drawn through the apparatus by the pinch rolls 126 in a continuous flow— with the strip riding on either of the rolls 111 or 112. At this time the pressure rolls 118 and 124 are retracted so that the moving strip is clear of these pressure rolls and also of the driven roll 116. While this first strip length is being run through the apparatus the leading end of the next succeeding strip length is entered into the pass formed by roll 116 which is opposite the path of the moving strip, and the contiguous pressure roll 118 or 124 is brought into clamping relation with said leading end by actuation of either of the cylinders 121 or 125. To facilitate such entry feeding fixed supporting guides 127 and 128 may be provided as shown in FIGURE 1. With the leading end of the next succeeding strip length so clamped between roll 116 and one of the pressure rolls the former may be controllably rotated (driven) in proper direction to move the leading extremity of this next succeeding strip length into proper position within the strip joining apparatus where it can be quickly joined by any suitable method to the tail end portion of the first strip length after the latter has been stopped by stopping the pinch rolls 126. The trailing end of this first strip length may be stopped ahead of, within or beyond the pass formed between roll 116 and the other of the pressure rolls, depending on the particular requirements of the strip joining apparatus.

If and when the preloading mechanism of this invention is used with strip joining apparatus of the kind described at the beginning of this specification, I provide a double entry clamp between the preloading mechanism and the joining apparatus which may be of the kind disclosed in the above-mentioned co-pending application Serial No. 851,287 and which is partially shown herein in FIGURE 1 and more fully in FIGURE 3. Referring to the latter figure, the entry clamp is comprised of a frame 129 which is adapted to be shuttled vertically by fluid cylinders 130. Centrally disposed within frame 129 is a middle clamp bar 131 above which is disposed an upper clamp bar 132 arranged to be moved vertically and into clamping relation with bar 131 by cylinders 133. A similar vertically movable lower clamp bar 134 is arranged to be actuated by cylinders 135. The operation of the double entry clamp in relation to the strip joiner of the specific nature illustrated and to the preloader of the present invention will now be briefly described, and it will become apparent from such description that the preloading mechanism of the present invention is of a special utility in the overall combination.

Assuming that strip is running through the assembled apparatus along path 95, the leading end of the next succeeding strip length (coming from the lower uncoiler or source) is moved between rolls 116 and 124, cylinder 125 is actuated to clamp this leading end against drive roll 116, and thereafter roll 116 is driven in proper direction to move the leading end extremity of this next succeeding strip length slightly past the first blade of the shear 99, 101. With the new strip length thus properly positioned, the cylinders 135 are actuated to clamp the strip between bars 131 and 134, and immediately thereafter the pressure roll 124 may be retracted. As the tail end of the strip moving along path 95 approaches roll 116, this strip is stopped by stopping pinch rolls 126 and immediately thereafter the double entry clamp (frame 129), the top shoes of clamps 11 and 12, and the top pressure roll 118 may be simultaneously moved downwardly to accomplish, respectively, (a) the clamping of the top strip in clamp 12 and the clamping of both top and bottom strip in overlying relation in the clamp 11, (b) the drawing downward of the lower strip into the plane of the top surface of the lower fixed shoe of clamp 11, and (c) the clamping of the upper strip onto roll 116. Following very closely such movement the shear is actuated and thereafter in quick sequence the roll 116 is driven in proper direction and the clamp 11 is momentarily opened to expel the cropped tail end portion of the strip which had previously been advancing along path 95. It should be observed that during such momentary opening of clamp 11 the clamp provided by the bars 131 and 134 holds the lower strip in proper position within the apparatus. As soon as the cropped tail end is expelled, clamp 11 is reclosed and the joining sequence as outlined first above is resumed. By reason of the facts that the new strip is pre-positioned and that the drive roll 116 working with the pressure roll 118 is operative to very quickly expel the said cropped tail end, the whole cycle of operation is very short in point of time and a supply of strip, now coming from the lower uncoiler or other source is rapidly re-established at the exit of pinch rolls 126.

To allow for forward movement of the strip when the clamp 11 is moved forwardly by cylinder 17 in making the narrow overlap for welding, a small amount of slack is gathered in the new strip lengths between the roll 116 and the uncoiler or other source preparatory to initiation of the complete cycle outlined above.

When the supply of strip now moving along path 96 (all clamps open) is about exhausted and with the leading end portion of the next succeeding strip length having been loaded into the apparatus with the forward extremity thereof just past the first shear blade the moving strip is stopped, clamp bar 132 is moved toward bar 131 to clamp the new strip and the whole preloading clamp is moved further downwardly to bring the new strip flat onto the tail end of the preceding strip length which is now lying on the fix lower shoe of clamp 11, and immediately thereafter clamps 11, 12 and 124 are closed, the shear actuated, and the cropped tail end of strip now lying in path 96 expelled by energization of roll 116 and the simultaneous opening clamp 11 as explained above.

The wedge-shaped deflector 117 is pivoted for swinging movement about the axis of roll 116 and connected to the mounting structure (which is not shown) for the deflector 117 is an operating arm 117' actuated by a cylinder 117". In operation, the actuation of cylinder 117" is timed and directed synchronously with actuation of the cylinders 130 which move the center clamp bar 131 upwardly or downwardly as required so that no sharp bends or kinks are imparted in the successive strip lengths loaded into the joining apparatus. The operation is such that in general the free swinging end of deflector 117 is horizontally aligned with the clamp bar 131 but the parts are so proportioned, however, that sufficient clearance is provided for the retraction of cropped tail ends regardless of the position of the deflector 117.

It should now be apparent that I have provided an improved and simplified preloading mechanism for strip joining apparatus which accomplishes the object initially set out. Of particular merit is the roll arrangement utilized in such mechanism wherein only a single driven roll is required with the other rolls being merely idlers and only two of which require movable supports. The mechanism is very compact, economical to construct, does not easily get out of adjustment, and contains no parts which are subject to rapid wear. Further, the roll arrangement not only facilitates the preloading of the successive strip ends but provides a means for accurately positioning the forward extremities of these strip lengths, and, further, provides a simple and ingenuous device for expelling the cropped tail ends of the strip lengths if the strip joining apparatus used requires this to be done.

Having thus described my invention, what I claim is:

1. A stock preloader for strip joining apparatus of the kind having a strip joining station and through which a strip length is adapted to move longitudinally in a substantially continuous manner comprising a vertically spaced pair of guide rolls extending transversely at the entry end of said apparatus over which strip lengths supplied from a pair of vertically divergent sources are adapted to be entrained to thus establish upper and lower paths of strip travel through said apparatus, a drive roll parallel with and positioned forwardly of said guide rolls vertically intermediate thereof, an upper pressure roll adapted to clamp strip onto the top of said drive roll to feed a leading end portion of a strip length supplied by said upper source along said upper path while strip from said lower source is running through said apparatus along said lower path, a lower pressure roll adapted to clamp strip onto the bottom of said drive roll to feed a leading end portion of a strip length supplied by said lower source along said lower path while strip from said upper source is running through said apparatus along said upper path, means to move said upper and lower pressure rolls selectively into pressure engagement with said drive roll, and means to drive said drive roll in opposite directions.

2. A stock preloader according to claim 1 further including a deflector positioned between said guide rolls and having generally curved upper and lower guide surfaces adapted to divert strip coming from said upper source into said upper path and strip coming from said lower source into said lower path.

3. A preloader according to claim 1 further including a deflector positioned between said guide rolls and forming with said guide rolls upper and lower passages for strip moving along said upper and lower paths, respectively, a strip clamp having a centrally disposed bar extending transversely and intermediate the upper and lower strip paths in general longitudinal continuation of said diverter, an upper strip clamp bar and means to move said upper bar toward and away from the first mentioned bar to form a strip clamp therebetween, and a lower strip clamp bar and means to move said lower strip clamp bar toward and away from the first mentioned bar to form therebetween a second or lower clamp for strip.

4. A stock preloader according to claim 3 further including power means to lower and raise all said bars in unison.

5. Apparatus according to claim 1 further including a pair of transversely spaced uprights to journal said guide rolls at their ends, arms swingably mounted on said uprights for movement about horizontal axes and journaling at their outer free ends the ends of said pressure rolls, upper and lower synchronizing shafts spanning said uprights and journaled therein, means to rock said shafts, crank arms rigidly connected to the outer ends of said shafts, and links interconnecting the outer free ends of said crank arms and the outer free ends of the first mentioned arms, the assembly being such that said means to rock comprises the means to move said pressure rolls toward and away from said drive roll while maintaining parallelism between the axes of said rolls.

References Cited in the file of this patent

UNITED STATES PATENTS

| | | |
|---|---|---|
| 2,369,830 | Johnson et al. | Feb. 20, 1945 |
| 2,757,242 | Ranger | July 31, 1956 |